(12) United States Patent
Hedblom et al.

(10) Patent No.: US 6,247,818 B1
(45) Date of Patent: *Jun. 19, 2001

(54) METHOD FOR MAKING RETROREFLECTIVE ELEMENTS HAVING ENHANCED RETROREFLECTIVITY UNDER DRY AND/OR WET CONDITIONS

(75) Inventors: Thomas P. Hedblom, Eagan; Eric E. Rice, Woodbury, both of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,857

(22) Filed: Oct. 20, 1998

(51) Int. Cl.[7] .................................................... G02B 5/128
(52) U.S. Cl. ........................ 359/540; 359/539; 359/900; 428/325
(58) Field of Search ..................................... 359/534, 535, 359/536, 537, 538, 540, 542, 547, 551, 552, 900; 428/325

(56) References Cited

U.S. PATENT DOCUMENTS

| | | |
|---|---|---|
| 2,043,414 | 6/1936 | Korff . |
| 2,326,634 | 8/1943 | Gebhard et al. . |
| 2,354,018 | 7/1944 | Heltzer et al. . |
| 2,354,048 | 7/1944 | Palmquist . |
| 2,407,680 | 9/1946 | Palmquist et al. . |
| 2,440,584 | 4/1948 | Heltzer et al. . |
| 2,592,882 | 4/1952 | Fisher et al. . |
| 3,043,196 | 7/1962 | Palmquist et al. . |
| 3,175,935 | 3/1965 | Vanstrum . |
| 3,252,376 | 5/1966 | De Vries . |
| 3,254,563 | 6/1966 | De Vries . |
| 3,274,888 | 9/1966 | Vanstrum et al. . |
| 3,413,058 | 11/1968 | Tung et al. . |
| 3,418,896 | 12/1968 | Rideout . |
| 3,486,952 | 12/1969 | Vanstrum et al. . |
| 3,556,637 | 1/1971 | Palmquist . |
| 3,702,213 | 11/1972 | Schwab . |
| 3,709,706 | 1/1973 | Sowman et al. . |
| 3,795,435 | 3/1974 | Schwab . |
| 3,849,351 | 11/1974 | Jorgensen . |
| 3,891,451 | 6/1975 | Okazaki et al. . |
| 3,894,791 | 7/1975 | Watanabe . |
| 3,935,158 | 1/1976 | Eigenmann . |
| 3,958,891 | 5/1976 | Eigenmann . |
| 4,030,958 | 6/1977 | Stenemann . |
| 4,055,377 | 10/1977 | Erickson et al. . |

(List continued on next page.)

FOREIGN PATENT DOCUMENTS

| | | | |
|---|---|---|---|
| 0 322 671 A3 | 7/1989 | (EP) | ................................. E01F/9/04 |
| 385 746 | 9/1990 | (EP) . | |
| 1036392 | 7/1966 | (GB) . | |
| 2255312 | 4/1992 | (GB) . | |
| WO 97/01675 | 1/1997 | (WO) . | |
| WO 97/01677 | 1/1997 | (WO) . | |
| WO 97/28470 | 8/1997 | (WO) | ............................. G02B/5/128 |

OTHER PUBLICATIONS

Organic Coatings: Science and Technology, vol. I, Film Formation, Components, and Appearance, Zeno W. Wicks, Jr., Frank N. Jones and S. Peter Pappas, ed., John Wiley & Sons, Inc., New York, 1992.

*Primary Examiner*—Cassandra Spyrou
*Assistant Examiner*—Euncha Cherry
(74) *Attorney, Agent, or Firm*—Rudolph P. Hofmann, Jr.

(57) ABSTRACT

The present invention comprises a method for making retroreflective elements which are retroreflective under dry and/or wet conditions. The method provides a means for placing optical elements and/or skid-resistant particles on selected surfaces.

22 Claims, 1 Drawing Sheet

U.S. PATENT DOCUMENTS

Figure 1:
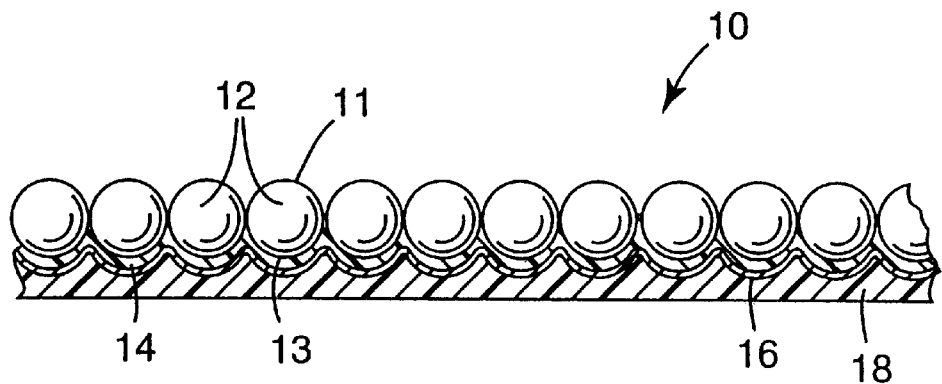

| | | |
|---|---|---|
| 4,072,403 | 2/1978 | Eigenmann . |
| 4,082,426 | 4/1978 | Brown . |
| 4,104,102 | 8/1978 | Eagon et al. . |
| 4,117,192 | 9/1978 | Jorgensen . |
| 4,145,112 | 3/1979 | Crone et al. . |
| 4,166,147 | 8/1979 | Lange et al. . |
| 4,203,878 | 5/1980 | Bauer . |
| 4,226,658 | 10/1980 | Carlson et al. . |
| 4,248,932 | 2/1981 | Tung et al. . |
| 4,367,920 | 1/1983 | Tung et al. . |
| 4,388,359 | 6/1983 | Ethen et al. . |
| 4,411,553 | 10/1983 | Eigenmann . |
| 4,490,432 | 12/1984 | Jordan . |
| 4,505,967 | 3/1985 | Bailey . |
| 4,511,210 | 4/1985 | Tung et al. . |
| 4,564,556 | 1/1986 | Lange . |
| 4,569,857 | 2/1986 | Tung et al. . |
| 4,648,932 | 3/1987 | Bailey . |
| 4,652,172 | 3/1987 | Eigenmann . |
| 4,664,966 | 5/1987 | Bailey et al. . |
| 4,681,401 | 7/1987 | Wyckoff . |
| 4,758,469 | 7/1988 | Lange . |
| 4,767,659 | 8/1988 | Bailey et al. . |
| 4,772,511 | 9/1988 | Wood et al. . |
| 4,875,798 | 10/1989 | May . |
| 4,937,127 | 6/1990 | Haenggi et al. . |
| 4,950,525 | 8/1990 | Bailey . |
| 4,969,713 | 11/1990 | Wyckoff . |
| 4,983,458 | 1/1991 | Dejaiffe . |
| 4,988,541 | 1/1991 | Hedblom . |
| 4,988,555 | 1/1991 | Hedblom . |
| 5,008,142 | 4/1991 | Wilson et al. . |
| 5,053,253 | 10/1991 | Haenggi et al. . |
| 5,077,117 | 12/1991 | Harper et al. . |
| 5,108,218 | 4/1992 | Wyckoff . |
| 5,114,193 | 5/1992 | Nass . |
| 5,124,178 | 6/1992 | Haenggi et al. . |
| 5,139,590 | 8/1992 | Wyckoff . |
| 5,227,221 | 7/1993 | Hedblom . |
| 5,268,789 | 12/1993 | Bradshaw . |
| 5,316,406 | 5/1994 | Wyckoff . |
| 5,478,596 | 12/1995 | Gurney . |
| 5,557,461 | 9/1996 | Wyckoff . |
| 5,620,775 | 4/1997 | LaPerre . |
| 5,643,655 | 7/1997 | Passarino . |
| 5,667,334 | 9/1997 | Boyce . |
| 5,667,335 | 9/1997 | Khieu et al. . |
| 5,670,227 | 9/1997 | Hedblom et al. . |
| 5,676,488 | 10/1997 | Hedblom . |
| 5,750,191 | 5/1998 | Hachey . |
| 5,774,265 | 6/1998 | Mathers et al. . |
| 5,777,791 | 7/1998 | Hedblom . |
| 5,812,317 * | 9/1998 | Billingsley et al. .................. 359/536 |
| 5,822,120 | 10/1998 | Palazzotto et al. . |
| 5,917,652 * | 6/1999 | Mathers et al. ....................... 359/536 |

* cited by examiner

METHOD FOR MAKING RETROREFLECTIVE ELEMENTS HAVING ENHANCED RETROREFLECTIVITY UNDER DRY AND/OR WET CONDITIONS

FIELD OF THE INVENTION

The present invention relates to a method for making retroreflective elements. More particularly, the present invention relates to a method for making retroreflective elements having enhanced retroreflectivity under dry and/or wet conditions.

BACKGROUND OF THE INVENTION

The use of pavement markings (e.g., paints, retroreflective elements, tapes, and raised pavement markings) to guide and direct motorists traveling along a roadway is well known. These pavement markings often are retroreflective so motorists can see the markings at night. However, when the roadway is wet, for example from rainfall, the pavement marking in turn becomes wet and often the retroreflective performance diminishes.

Retroreflection describes the mechanism where light incident on a surface is reflected so that much of the incident beam is directed back toward its source. When the surface of the pavement marking becomes wet, the optical elements (i.e., transparent, substantially spherical, glass or ceramic lenses) become coated with water, which typically reduces retroreflection. When optical elements become wetted or covered with water, the ratio of the refractive index at the exposed-lens surface changes which affects the light gathering.

Examples of retroreflective elements or aggregates known in the art include, but are not limited to, U.S. Pat. Nos. 3,252,376; 3,254,563; 4,983,458; 4,072,403; 4,652,172; 5,268,789; 5,750,191; 5,774,265; and 5,822,120. Many variations are known, but the retroreflective elements essentially have a core with optical elements embedded in the core surface. Some known embodiments also contain optical elements dispersed throughout the core. The core typically is regularly shaped e.g., spheres, tetrahedrons, discs, square tiles, etc. Retroreflective elements are advantageous because they can be embedded into inexpensive painted markings.

Retroreflective elements largely comprise polymeric cores or binders. A pigmented core or binder often serves as a diffuse reflector. This arrangement allows optical elements to be used on either horizontal or vertical surfaces. Other constructions have transparent optical elements comprising a specular reflector such as metallic silver. The metallic surface directs light back towards the source and a pigmented core is not necessary. Because of the geometry of the optics, a specular coated optical element would not be as effective if embedded in a pavement marking paint (a horizontal surface), and would be more highly effective if embedded in the vertical (i.e. generally up-right) edges of a retroreflective element.

Retroreflective elements can also be constructed having a ceramic core and glass optical elements with a metallic specular coating, (e.g., U.S. Pat. Nos. 3,043,196, 3,175,935, 3,556,637, 3,274,888, 3,486,952, EP 0,322,671). Ceramic retroreflective elements typically exhibit greater resistance to weathering and to wear, but often require substantially higher processing temperatures which increases cost.

Retroreflective elements can be formed by various methods. For example, drops of liquid resin can dropped into a bed of glass optical elements. The optical elements embed into the resin and then the resin hardens. (U.S. Pat. No. 3,254,563).

Another formation method is casting liquid resin mixed with glass optical elements into a desired shape and spraying the exposed surfaces with additional glass optical elements. The resin is then hardened. (U.S. Pat. No. 4,983,458).

Another method is calendering polymeric material through a set of rollers containing die-forming recesses. The optical elements are then attached to the bottom of the core with a transparent polymer binder. Specular film is applied by vacuum metallization. (U.S. Pat. Nos. 4,072,403, 4,652, 172, 5,268,789).

U.S. Pat. No. 3,958,891 discloses skid-resistant or retroreflective elements manufactured by cutting or punching small disks from calendered tape (such as epoxy or polyurethane resin). The disks are then coated with a layer of resinous binder and a monolayer of optical elements. After the binder substantially sets, a further layer of binder and a monolayer of optical elements are applied. These steps are repeated until the desired coating of optical elements is obtained.

Another method of forming retroreflective elements is to extrude and pelletize cores and then place the cores in a bed of pre-heated optical elements, where the optical elements embed into the core (U.S. Pat. No. 5,750,191, Hachey et al.).

Each of these methods forms a retroreflective element having optical elements covering substantially all of the core surface area.

One means of reducing the cost of retroreflective elements without substantially affecting retroreflective performance, is to selectively place optical elements on vertical surfaces. The optical elements are relatively expensive, particularly the ceramic optical elements, thus limiting their placement to vertical surfaces where light is optimally retroreflected and foregoing placement on horizontal surfaces, is often desirable.

In the embossed pavement marking tape area, U.S. Pat. Nos. 5,227,221, 4,988,555, and 4,988,541 disclose pavement marking tapes having a patterned base sheet and selectively applying a bonding material to the protuberances so that the optical elements and/or skid-resistant particles are secured exclusively to the protuberances having bonding material where they are most effective. The optical elements and/or skid-resistant particles are substantially absent from the valleys where they make little contribution to the retroreflective performance or the skid resistance of the pavement marking. By selectively securing the optical elements and skid-resistant particles to the protuberances, fewer optical elements and fewer skid-resistant particles can be employed without sacrificing retroreflective performance and skid-resistance.

In the retroreflective element area, U.S. Pat. No. 3,418, 896 discloses shaped polymeric retroreflective elements having a pigmented core and glass optical elements embedded in the vertical edges. These retroreflective elements are formed by extruding or otherwise molding the pigmented polymer into rods of different cross-sectional shape. Glass optical elements are embedded into the surface of the polymer before it hardens, then the rods are sliced to form the desired retroreflective elements. During the application step, the glass spheres are at the temperature of the extruded rods. This process is difficult to scale up because a hot, partially molten strand of core material is generally quite weak and tends to break during processing.

U.S. Pat. No. 5,822,120 (Palazotto et al.) discloses a retroreflective element comprising a core having a central layer and barrier layers applied to two major surfaces of the core layer, and a plurality of optical elements embedded in the other surfaces of the core layer. The retroreflective element can be made by extruding a central layer between the barrier layers, calendering to a desired thickness, processing into a desired shape and size, and then embedding the optical elements. The core of the retroreflective elements disclosed in Palazotto et al. typically is pigmented throughout to provide a system for retroreflection.

The need exists for a method of making retroreflective elements having optical elements and/or skid-resistance particles on selected surfaces and having enhanced retroreflection when wet and which provide delineation in dry and in wet conditions, and in low visibility conditions improving driver knowledge of vehicle position thereby increasing driver safety.

SUMMARY OF THE INVENTION

The present invention provides a method for making retroreflective elements which are retroreflective under dry and/or wet conditions. The retroreflective elements of the present invention comprise a core which does not have a retroreflective function. The optical elements are not directly attached to the core layer, thus the core layer is not required to be reflective. The core provides support for the retroreflective element. Surprisingly, some embodiments of the present invention have enhanced retroreflection when exposed to water, for example, when wet by rainwater.

The method of the present invention provides a means for placing optical elements and/or skid-resistant particles on selected surfaces. This method also provides a means to obtain retroreflective elements having a desired shape, size, and uniform thickness.

The method of the present invention comprises the steps of:

(a) providing at least one retroreflective article wherein said retroreflective article comprises;
   (i) a monolayer of exposed-lens optical elements;
   (ii) a spacing layer; and
   (iii) a reflective layer;
(b) forming a core layer;
(c) attaching said retroreflective article(s) onto said core layer yielding a retroreflective composite; and
(d) dividing said retroreflective composite into retroreflective elements.

FIGURES

FIG. 1 is a cross-section of a retroreflective element 10 comprising a layer of optical elements 12 having an exposed-lens surface 11 and an embedded-lens surface 13, a spacing layer 14, a reflective layer 16, and a core layer 18.

Figure 2:
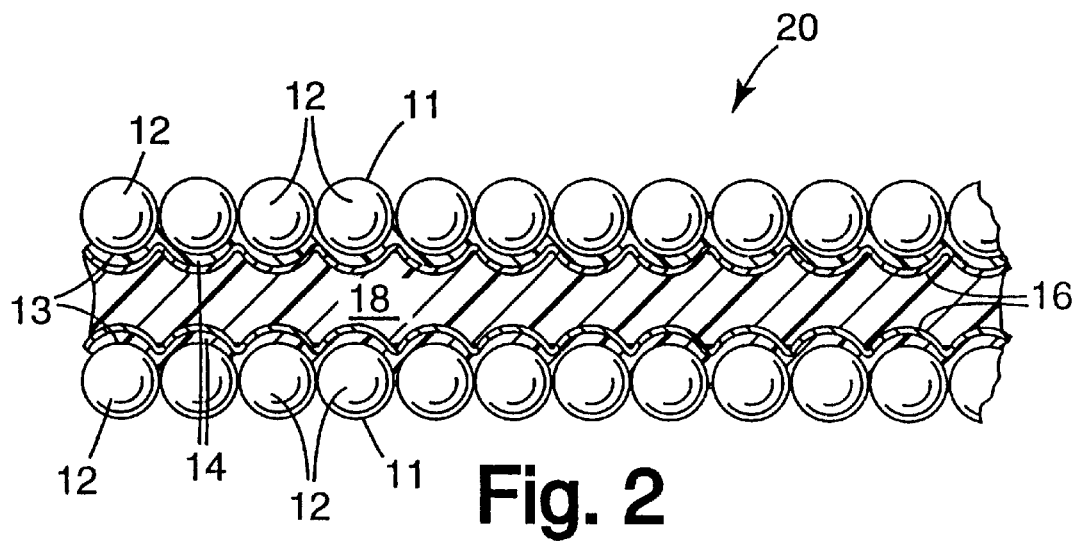

FIG. 2 is a cross-section of a retroreflective element 20 comprising a layer of optical elements 12 having an exposed-lens surface 11 and an embedded-lens surface 13, a spacing 14, a reflective layer 16, and a core layer 18.

The figures, which are idealized and not to scale, are intended to be merely illustrative and non-limiting.

DETAILED DESCRIPTION OF ILLUSTRATIVE EMBODIMENTS

The present invention provides a method of making retroreflective elements where said retroreflective elements comprise a retroreflective article which comprises a monolayer of exposed-lens optical elements, a spacing layer, and a reflective layer; and a core layer. These retroreflective elements are retroreflective under wet and/or dry conditions.

The present invention provides a method for making retroreflective elements having optical elements and/or skid-resistant particles on selected surfaces. The retroreflective elements of the present invention provide a core layer which functions independently of the optics. Although the core layer may be pigmented for aesthetics, the core layer need not be reflective.

The retroreflective elements are attached to the surface of a road or other traffic-bearing surface using a road binder material or are adhered to a preformed pavement marking tape.

Pavement markings typically exhibit high retroreflective brightness when the light is incident at high entrance angles (typically greater than about 85°). Retroreflective sheeting and other retroreflective articles attached to vertical surfaces, on the other hand, tend to exhibit high retroreflective brightness at lower entrance angles (e.g., within 30° to 40° of normal). Thus, the optical requirements of pavement markings differ from the optical requirements of retroreflective sheeting.

Generally, the present invention provides a method for making retroreflective elements comprising attaching at least one retroreflective article to a core layer to form a retroreflective composite. This retroreflective composite is then divided into retroreflective elements of desired size and shape.

Retroreflective Article

The retroreflective article comprises a layer of exposed-lens optical elements, a spacing layer and a reflective layer.

Optical Element Layer

A wide variety of optical elements are suitable in the present invention. The optical elements are exposed-lens. Exposed-lens is defined herein as having at least a portion of the optical element open to the air upon initial application to a traffic-bearing surface. After use on the traffic-bearing surface, the exposed-lens may become coated with oil, dust, road debris, etc. The portion of the optical element that is in contact with the spacing layer, or not the exposed-lens portion, is the embedded-lens portion.

However, various surface treatments may be present on the exposed-lens surface of the optical elements. For example, these treatments may be residual coatings used to enhance the adhesion of the optical element to the spacing layer. In addition, various surface treatments may be present in small quantities on the surface of the optical elements (i.e., both the exposed-lens surface and the embedded-lens surface) to enhance the adhesion of the retroreflective element to the binder or road binder and/or to modify the wicking of the binder or road binder around the retroreflective element. In all these cases, the thin films or surface treatments on the exposed-lens optical elements may temporarily affect the wetting of rain on the surface of the marking.

Typically, for optimal retroreflective effect, the optical elements have a refractive index ranging from about 1.5 to about 2.0 for optimal dry retroreflectivity, preferably ranging from about 1.5 to about 1.8. For optimal wet retroreflectivity, the optical elements have a refractive index ranging from about 1.7 to about 2.4, preferably ranging from about 1.9 to 2.4, and more preferably ranging from about 1.9 to about 2.1.

The layer of optical elements may comprise optical elements having the same, or approximately the same refractive index. Alternatively, the layer of optical elements may comprise optical elements having two or more refractive indices. Typically, optical elements having a higher refractive index perform better when wet and optical elements having a lower refractive index perform better when dry. When a blend of optical elements having different refractive indices is used, the ratio of the higher refractive index optical elements to the lower refractive index optical elements is preferably about 1.05 to about 1.4, and more preferably from about 1.08 to about 1.3.

Generally, optical elements having about 50 to about 1000 micrometers average diameter (preferably about 50 to about 500 micrometers average diameter, and more preferably from about 150 to about 350 micrometers average diameter) are suitable for the present invention. The optical element layer may comprise optical elements having the same, or approximately the same average diameter. Alternatively, the optical element layer may comprise optical elements having two or more average diameters. Typically, optical elements having a larger average diameter perform better when dry, while optical elements having a smaller average diameter perform better when wet.

Blends of optical elements having both different average diameter and refractive index may be used. Typically, a larger average diameter lower refractive index optical element is used to achieve better dry retroreflectivity, while a smaller average diameter higher refractive index optical element is used to achieve better wet retroreflectivity.

The optical elements comprise an amorphous phase, a crystalline phase, or a combination, as desired. The optical elements preferably comprise inorganic materials that are not readily susceptible to abrasion. Suitable optical elements include, for example, microspheres formed of glass such as soda-lime-silicate glasses.

Microcrystalline ceramic optical elements as disclosed in U.S. Pat. Nos. 3,709,706; 4,166,147; 4,564,556; 4,758,469; and 4,772,511 have enhanced durability. Preferred ceramic optical elements are disclosed in U.S. Pat. Nos. 4,564,556, 4,772,511 and 4,758,469. These optical elements are resistant to scratching and chipping, are relatively hard (above 700 Knoop hardness). These ceramic optical elements may comprise zirconia, alumina, silica, titania, and mixtures thereof.

The optical elements can be colored to retroreflect a variety of colors. Techniques to prepare colored ceramic optical elements that can be used herein are described in U.S. Pat. No. 4,564,556. Colorants such as ferric nitrate (for red or orange) may be added in an amount of about 1 to about 5 weight percent of the total metal oxide present. Color may also be imparted by the interaction of two colorless compounds under certain processing conditions (e.g., $TiO_2$ and $ZrO_2$ may interact to produce a yellow color). The optical elements may be colored so that, for example, colorless, yellow, orange, or some other color of light is retroreflected at night.

The optical elements are typically partially embedded in the spacing layer in a hexagonal close-packed arrangement. In certain product applications, it may be advantageous to have the optical elements applied at less than the close-packed rate.

Spacing Layer

The pavement marking articles of the present invention comprise a spacing layer. The spacing layer "cups" the optical elements. The spacing layer comprises two major surfaces. The first surface is in contact with the embedded-lens surface of the optical elements. The second major surface of the spacing layer is next to the reflective layer and follows a radius of curvature (preferably the radius of curvature is such that the spacing layer forms a concentric hemisphere with respect to the optical element) larger than the optical element with an origin approximately at the center of the optical element. This forms the "cup".

The spacing layer can be applied to the optical elements using various techniques, including but not limited to, solution coating, curtain coating, extrusion, lamination, and powder coating. Processing the spacing layer into a cup may include, but is not limited to, A solvent evaporation, sagging of the spacing layer under the forces of gravity, displacement of the spacing layer due to fluid forces, or electrostatic deposition. Solidification of the spacing layer can include, but is not limited to, drying, chemical reaction, temporary ionic bonds, or quenching.

Generally, the spacing layer is comprised of polyvinyl butyral, polyurethanes, polyesters, acrylics, acid olefin copolymers such as ethylene acrylic acid, ethylene methacrylic acid, acid olefin copolymers neutralized with a base "ionomers", polyvinyl chloride and its copolymers, epoxies, polycarbonates, and mixtures thereof.

When selecting polymer systems for the spacing layer, optical transparency is a requirement. Generally, the spacing layer preferably has a 70% or greater transparency to visible light, more preferably 80% or greater, and most preferably 90% or greater.

Various additives such as stabilizers, colorants, uv absorbers, antioxidants, etc., can be added to the spacing layer material to affect the processing, weathering, or retroreflective color.

The refractive index of the spacing layer generally ranges from about 1.4 to about 1.7, preferably from about 1.4 to about 1.6, and more preferably from about 1.45 to about 1.55.

The thickness of the spacing layer varies with the refractive index and the size of the optical elements. Generally, assuming the optical elements have the same refractive index and the same size (i.e., average diameter), the thicker the spacing layer, the better the optics when the pavement marking article is wet. Typically, the relative thickness of the spacing layer to the optical element radius ranges from about 0.05 to about 1.4, preferably from about 0.1 to about 0.9, and more preferably from about 0.2 to about 0.9.

For dry retroreflectivity, the optimal spacing layer thickness relative to the average radius of the optical element (for a refractive index ranging from about 1.5 to about 1.85) is given by the following formula for a 1.5 refractive index spacing layer:

$$\text{spacing layer thickness/optical element radius} = \exp[-6.89*(\text{optical element refractive index})+10.2]$$

The suitable range of the relative spacing layer thickness is about ±0.15 for low refractive index optical elements and about ±0.1 for high refractive index optical elements.

For wet retroreflectivity, the optimal spacing layer thickness relative to the average radius of the optical element (for a refractive index ranging from about 1.7 to about 2.4) is given by the formula for a 1.5 refractive index spacing layer:

$$\text{spacing layer thickness/optical element radius} = \exp[-3.99*(\text{optical element refractive index})+7.20]$$

The suitable range of the relative spacing layer thickness is about ±0.20 for low refractive index optical elements and about ±0.1 for high refractive index optical elements.

For other refractive indices for the spacing layer, some variation in the above equation will result. Lower refractive index spacing layers will lead to a decreased spacing layer thickness. Higher refractive index spacing layers will lead to an increased spacing layer thickness. Thinner spacing layers will generally yield an improved retroreflective angularity of the retroreflective article.

The spacing layer may have the same, or approximately the same, thickness throughout the retroreflective element.

Alternatively, the spacing layer thickness may vary across the retroreflective element. The spacing layer thickness may also vary sinusoidally. Suitable methods to vary the spacing layer thickness include, but are not limited to, extrusion with variable drawings speeds; extrusion with a profiled die; powdercoating with different web conductivities downweb and/or crossweb; and solution coating with a multiple orifice die.

Reflective Layer

The reflective layer may comprise either a diffuse reflector or a specular reflector.

The diffuse reflector typically comprises a diffuse pigment. Examples of useful diffuse pigments include, but are not limited to, titanium dioxide, zinc oxide, zinc sulfide, lithophone, zirconium silicate, zirconium oxide, natural and synthetic barium sulfates, and combinations thereof. The diffuse pigment is typically delivered to the back of the spacing layer via a polymeric coating. The polymeric coating may be applied using a variety of techniques such as knife coating, roll coating, extrusion, or powder coating.

Illustrative examples of suitable polymeric materials include thermoset materials and thermoplastic materials. Suitable polymeric material includes, but is not limited to, urethanes, epoxies, alkyds, acrylics, acid olefin copolymers such as ethylene/methacrylic acid, polyvinyl chloride/polyvinyl acetate copolymers, etc.

The specular reflector may be a specular pigment, a metallized layer, or multilayered di-electric materials.

An example of a useful specular pigment is a pearlescent pigment. Useful pearlescent pigments include, but are not limited to, AFFLAIR™ 9103 and 9119 (obtained from EM Industries, Inc., New York), Mearlin Fine Pearl #139V and Bright Silver #139Z (obtained from The Mearl Corporation, Briarcliff Manor, N.Y.).

The reflective layer may also comprise thin metallic films. These thin metallic films may be applied by precipitation (e.g. precipitating silver nitrate), thermal evaporation in a vacuum (e.g. resistive heating of Ag, Al; exploding wire; laser evaporation; and the like), sputtering (e.g. glow discharge) and chemical methods (e.g. electrodeposition, chemical vapor deposition). Resistive heating of aluminum is the presently preferred method of coating thin metallic films.

Another suitable reflective layer includes multi-quarter wavelength layers of various dielectric materials. An odd number of stacks of high and low refractive index films can yield reflectances close to 100 percent. These multilayer thin films can be applied by thermal evaporation and chemical methods.

Different combinations of spacing layer thickness, spacing layer refractive index, optical element diameter, and optical element refractive index may be used in the present invention. For example, two different refractive index optical elements having approximately the same average diameter may be combined with a spacing layer having a thickness which varies cross-web. Another example of a suitable combination is an optical element layer comprising two different average diameter optical elements having different refractive indices with a spacing layer which having approximately the same thickness downweb and crossweb.

Core Layer

Suitable core layer material includes polymeric materials, both thermoplastic and thermoset materials and mixtures thereof. Particular examples of suitable material can be readily selected by those skilled in the art. Potential core layer materials can be selected from a wide range of thermoplastic materials. For example, non-crosslinked elastomer precursors (e.g., nitrile rubber formulations), ethylene-vinylacetate copolymers, polyesters, polyvinylacetate, polyurethanes, polyureas, acrylic resins, methacrylic resins, ethyleneacrylate/methacrylate copolymers, ethylene-acrylic acid/methacrylic acid copolymers, polyvinyl butyral, and the like are useful. The core layer material can be comprised of one or more resin materials.

Illustrative examples of thermoset materials useful for the core layer include amino resins, thermosetting acrylic resins, thermosetting methacrylic resins, polyester resins, drying oils, alkyd resins, epoxy and phenolic resins, polyurethanes based on isocyanates, polyureas based on isocyanates, and the like. Such compositions are described in detail in Organic Coatings: Science and Technology, Volume I: Film Formation, Components, and Appearance, Zeno W. Wicks, Jr., Frank N. Jones and S. Peter Pappas, ed., John Wiley & Sons, Inc., New York, 1992.

A stabilizing agent may be added to the core to improve resistance to UV light and/or heat of the core materials. For example, stabilizing agents such as nickel chelates, hindered phenols, and aryl esters may be included. Stabilizing agents also may include hindered amine light stabilizers (HALS) which may be present at levels up to about 5%. Exemplary HALS stabilizing agents are CHIMASSORB 944 available from Ciba-Geigy Corp., Additives Division, Hawthorne, N.Y., and CRYASORB UV 3346 available from American Cyanamid Co., Wayne, N.J. Other suitable stabilizing agents include, for example, antioxidants such as IRGANOX 1010 and IRGAFOS 168, both of which are available from Ciba-Geigy.

Processing aids can also be used to make the retroreflective elements of the present invention. Typically, these are added to the core materials to enhance processing. That is, when combined with the core materials and other optional additives, a processing aid enhances dispersion or mixing. Processing aids such as dispersants, surfactants, and lubricants may be added. Examples of such processing aids may be found in *Plastics Additives and Modifiers Handbook*, edited by Jesse Edenbaum, Van Nostrand Reinhold, New York, 1992.

Method of Making Retroreflective Articles

The retroreflective articles of the present invention may be made by first coating a cupping resin onto a liner such as polyethylene terephthlate (PET), paper, or the like. (See for example, U.S. Pat. No. 4,505,967 (Bailey) column 4, line 63). Suitable cupping resins include resins which have significantly lower viscosity than the spacing layer at the process temperature and which also exhibit low adhesion to the spacing layer (e.g., VITELTM 3300 resin available from Bostik, Middleton, Mass.). The cupping resin (generally about 0.05 to about 0.25 millimeters thick) can be placed on the liner (generally about 0.01 to about 0.1 millimeters thick) by bar coating and forced air drying, extrusion, or hot melt coating. After drying, the cupping film can be wound up.

Next, the spacing layer (i.e., a substantially transparent film) is coated (e.g., extruded; powdercoated) on top of the cupping film forming a composite spacing layer. The spacing layer may comprise, for example PRIMACOR 3440, (an extrusion grade thermoplastic, high molecular weight copolymer believed to comprise a major portion of ethylene monomer and a minor portion of acrylic acid monomer, available from Dow Chemical Co. Midland, Mich., having a melt flow index of about 10), a weather stabilizing system, and an antioxidant. This composite spacing layer is then wound up.

Several polymer processing techniques are useful for applying the spacing layer to the optical elements. When the optical elements have an average diameter less than about 100 microns, knife coating a polymeric solution on top of an optical element film will result in an adequately cupped spacing layer.

For larger retroreflective elements, powder coating produces a uniform thickness spacing layer on the optical elements. In one example of powder coating, a polymer is made or ground to about 30 micron mean particle size. The powder is fluidized and conveyed with compressed air to an electrostatic spray gun where the powder is charged by corona or triboelectric methods. The powder is then sprayed towards the optical element film which is over a conductive substrate or base plate that is maintained at electrical ground. When the charged powder comes close to the grounded optical element film, the powder particles adhere due to electrostatic attraction. The dynamics of the electrostatic attraction are such that the powder tends to collect at a uniform thickness over the three dimensional optical element film. The powder coated optical element film is then passed through an oven to fuse the powder onto the substrate. Various fluidized bed powder coating techniques can alternatively be employed to deliver a uniform thickness of powder over the optical element containing film prior to the powder fusing operation. Further processing may then take place.

A second film (i.e. the optical element carrier) is made by extruding a polyolefin (e.g., polyethylene) onto a liner such as PET, paper, or the like. The thickness of the polyolefin is commensurate with the optical element average radius The second film is heated to a temperature about the melting temperature of the film (e.g. for polyethylene film, above 135° C.). The optical elements are then dropped from a dispenser and partially embedded, preferably to about 30% or more of their average diameter, into the softened second film to form a monolayer of optical elements. This optical element film composite is then wound up.

Optionally, the optical elements can be coated with a surface treatment such as silane to help the optical elements adhere to the spacing layer. For example, this surface treatment can be applied by reverse roll coating a solution of A1100 (available from Union Carbide, Danbury, Conn.) in deionized water and then drying.

The optical element film composite is then laminated to the composite spacing layer to partially embed the optical elements into the spacing layer. This may be accomplished by heating the composite spacing layer (i.e., run over a hot can or through an oven) and then laminating the two composites together using a nip to form "the laminate".

During the lamination step, the cupping film has a lower viscosity than the spacing layer. This helps the spacing layer form a more uniform cup around the optical element. The degree to which the spacing layer cups the optical element has an affect on the angularity of the retroreflective element.

Next, the cupping film is stripped away from the composite spacing layer which is now adhered to the optical elements. The spacing layer becomes exposed and is cured if desired (e.g., ultraviolet radiation, e-beam). A reflective layer (e.g., vapor coating an aluminum metallic layer) is formed on the exposed portion of the spacing layer. The optical element carrier is stripped away from the laminate, exposing the optical elements. The resulting article is then wound up. The resulting retroreflective article includes the optical elements and behind the optical elements is the spacing layer backed by a reflective layer.

Method of Making Retroreflective Elements

The core layer may be formed using extrusion or calendering. Typically, the core layer is formed into the desired shape and size prior to attachment of the retroreflective article(s). However, the present method includes the situation where the core layer is extruded and then the retroreflective article(s) are attached onto the core layer in a continuous process.

The retroreflective article(s) can be attached to the core layer by lamination or extrusion of the core layer directly onto the retroreflective article(s). The retroreflective article(s) can be attached to the core layer directly. Alternatively, a binder layer may first be attached (e.g., coating, extrusion or lamination) to either the retroreflective article(s) or the core layer. Binder materials include, but are not limited to, pressure-sensitive adhesives, polyurethanes, polyureas, epoxy resins, polyamides, polyesters, and mixtures thereof. The combination of the retroreflective article(s) and the core layer yields a retroreflective composite.

Generally, the retroreflective article(s) are attached to the surfaces of the core layer which are generally up-right (i.e., "vertical"). A retroreflective element of the present invention comprises at least one vertical surface having a retroreflective article attached thereto and preferably is attached to two or more vertical surfaces or wrapped around a portion of the core layer.

The retroreflective composite is then divided into retroreflective elements of desired shape and size. The retroreflective composite may be divided by using any of the following methods: slitting, dicing, chopping with a knife, water jet, or die cutting.

To mark a road, often retroreflective elements of the invention are dropped or cascaded on a road binder already applied to the road surface. The retroreflective elements of the present invention can also be used on preformed tapes used as pavement markings. The retroreflective elements may be applied in an ordered or a random pattern. The size and shape, specifically the width and thickness, of the retroreflective element influences which surface ultimately adheres to the binder. The retroreflective elements can be formed into any desired shape using the method of the present invention. For retroreflective elements that are essentially simple geometric shapes, such as triangles, squares, pentagons, hexagons, octagons, diamonds, parallelograms, rectangles, and the like, preferably the shortest edge length of a major surface (i.e., non-vertical surface) is at least twice the thickness, so that the retroreflective elements tend to lay on their non-vertical surface. The ratio of the edge length to the thickness is designated as the aspect ratio.

The retroreflective elements can be any size, but preferably they fit within the width of the road binder or preformed pavement marking tape. The retroreflective element can be of any thickness, but preferably the thickness is such that when the retroreflective element is embedded in the road binder or attached to the preformed tape a sufficient number of optical elements are still exposed to give the desired retroreflectivity. However, as the portion of the retroreflective element exposed above the road binder increases, the retroreflective element may be subjected to undesirable shear stress leading to retroreflective element loss.

The presently preferred dimensions of the retroreflective elements are approximately about 1.0 to about 2.5 millimeters (about 40 to about 100 mil) thickness, about 0.50 to about 1.0 centimeter width, and about 0.50 to about 10 centimeter length.

The retroreflective article is attached to at least one surface of the core layer and is typically attached to two or more surfaces of the core layer.

Preformed Pavement Marking Tapes

The retroreflective elements made using the method of the present invention can be attached to preformed pavement marking tapes.

The retroreflective elements may be attached to either a flat or a protrusioned preformed tape. When the preformed tape has protrusions, the retroreflective elements preferably are adhered only to the "vertical" (i.e., generally up-right) surfaces of the protrusions, where they provide the most efficient retroreflection. However, the retroreflective elements may be attached to the top surface of the top layer of the preformed tape.

The retroreflective elements can be attached to the tape using a binder material. Suitable binder materials include, but are not limited to polyurethanes, polyureas, epoxy resins, polyamides, polyesters, and mixtures thereof, and those disclosed in U.S. Pat. Nos. 4,248,932 and 5,077,117.

The retroreflective elements may be embedded in the top layer of the pavement marking tape which typically is a top coat or a top film. Preferably, the top layer adheres well to the core layer of the retroreflective element.

Useful top layers are known in the art. Examples of suitable top layers include both thermoplastic and thermoset polymeric materials. Suitable polymeric materials include, but are not limited to, urethanes, epoxies, alkyds, acrylics, acid olefin copolymers such as ethylene/methacrylic acid, polyvinyl chloride/polyvinyl acetate copolymers, etc.

Another embodiment is a retroreflective element made according to the method of the present invention partially embedded in a road binder.

Road binders for retroreflective elements are well-known in the art. Suitable road binder materials include, but are not limited to, wet paint, thermoset materials, or hot thermoplastic materials (e.g., U.S. Pat. Nos. 3,849,351, 3,891,451, 3,935,158, 2,043,414, 2,440,584, 4,203,878, 5,478,596). Typically, retroreflective elements and skidresistant particles are sprinkled or otherwise applied to a road binder material while it is in a liquid state. The retroreflective elements or particles become partially embedded in the road binder material while it is liquid. The road binder material subsequently becomes solid resulting in retroreflective elements and/or particles partially embedded therein. Typically, the paint or thermoset or thermoplastic material forms a matrix which serves to hold the pavement marking articles in a partially embedded and partially protruding orientation. The matrix can be formed from durable two-component systems such as epoxies or polyurethanes, or from thermoplastic polyurethanes, alkyds, acrylics, polyesters, and the like. Alternate coating compositions that serve as a matrix and include the pavement marking articles described herein are also contemplated to be within the scope of the present invention.

Skid-Resistant Particles

Generally, skid-resistant particles are randomly sprinkled and become embedded in the binder material or road binder material while it is in a softened state. The skidresistant particles may also be embedded in the spacing layer. Illustrative examples of particularly useful skid-resistant particles include those disclosed in U.S. Pat. Nos. 5,124,178; 5,094,902; 4,937,127; and 5,053,253.

Applications

The retroreflective elements of the present invention can be dropped or cascaded onto binders such as wet paint, thermoset materials, or hot thermoplastic materials (e.g., U.S. Pat. Nos. 3,849,351, 3,891,451, 3,935,158, 2,043,414, 2,440,584, 4,203,878). In these applications, the paint or thermoplastic material forms a matrix that serves to hold the retroreflective elements in a partially embedded and partially protruding orientation. The matrix can be formed from durable two component systems such as epoxies, polyurethanes, or polyureas, or from thermoplastic polyurethanes, alkyds, acrylics, polyesters, and the like. Alternate coating compositions that serve as a matrix and include the retroreflective elements described herein are also contemplated to be within the scope of the present invention.

Typically, the retroreflective elements of the present invention are applied to a roadway or other surface through the use of conventional delineation equipment. The retroreflective elements are dropped in a random position or a prescribed pattern onto the surface, and each retroreflective element comes to rest with one of its faces disposed in a downward direction such that it is embedded and adhered to the paint, thermoplastic material, etc. If different sizes of retroreflective elements are used, they are typically evenly distributed on the surface. When the paint or other film-forming material is fully cured, the retroreflective elements are firmly held in position to provide an extremely effective reflective marker in dry and/or wet conditions.

EXAMPLES

The following examples further illustrate various specific features, advantages, and other details of the invention. The particular materials and amounts recited in these examples, as well as other conditions and details, should not be construed in a manner that would unduly limit the scope of this invention. Percentages given are by weight, unless otherwise specified.

Pavement marking examples 1 through 13 were prepared as follows. The top surface of the exposed-lens films was scrubbed with toothpaste and a toothbrush. This scrubbing removes any low surface energy contamination on top of the optical elements and facilitates the rain wetting out the optics. The reflective layer side of the exposed-lens films was laminated using a pressure-sensitive adhesive to LEXAN™ pieces measuring 10 centimeters long, 0.64 centimeters wide and 3.0 millimeters in height. The exposed-lens films were attached to the 3.0 millimeter by 10 centimeter side. The exposed-lens films were then trimmed to 3.0 millimeters by 10 centimeters producing a retroreflective element. The retroreflective elements were then mounted spaced about 5.8 centimeters apart onto an aluminum panel measuring 1.5 millimeters thick by 10 centimeters wide by 1.5 meters long to produce a pavement marking example.

Optical Elements

| Refractive Index | Type | Average Diameter | Distribution Range | Description |
|---|---|---|---|---|
| 1.5 | Glass | 165 microns | 150–180 microns | Potters Industries, Inc. Hasbrouch Heights, NJ |
| 1.5 | Glass | 200 microns | 180–210 microns | Potters Industries, Inc. Hasbrouch Heights, NJ |
| 1.75 | Ceramic | 220 microns | 180–250 microns | Example 4 of U.S. Pat. No. 4,564,556 |
| 1.91 | Ceramic | 165 microns | 150–180 microns | Example 1 of U.S. Pat. No. 4,772,511 |
| 1.93 | Glass | 65 microns | 53–74 | Nippon Electric Glass, Osaka, Japan; Flex-O-Lite, St. Louis, MO |
| 2.26 | Glass | 65 microns | 53–74 | Nippon Electric Glass; Flex-O-Lite |

Various methods of manufacturing 1.75 ceramic optical elements are available, such as described in Example 4 of U.S. Pat. No. 4,564,556. In that Example, a stable, ion-exchanged zirconia sol was prepared by mixing a nitrate stabilized zirconia sol containing about 20% $ZrO_2$ by weight and about 0.83 M $NO_3$ per mole $Zro_2$ (obtained from Nyacol Products Company), with an ion exchange resin (Amberlyst A-21 resin made by Rohm and Haase Company) in a ratio of about 100 g of sol to 15 g resin. To about 21 g of the resulting stable zirconia sol were added about seven grams of silica sol (Ludox LS), and then about 2.5 g of a 50% aqueous ammonium acetate solution were added to the sol with agitation. The resulting mixture (having a $ZrO_2:SiO_2$ mole ratio of about 1:1) was immediately added to 500 ml of 2-ethylhexanol under agitation in a 600 ml beaker. After stirring for about five minutes, the mixture was filtered to separate the gel particles from the alcohol. Very transparent, rigid gelled spheres up to and exceeding 1 mm in diameter were recovered. The particles were dried and subsequently fired to 1000° C. Intact, transparent to slightly translucent spheres up to and over 500 micrometers in diameter were obtained.

Various methods of manufacturing 1.91 ceramic optical elements are available, such as described in Example 1 of U.S. Pat. No. 4,772,511 as modified herein. In that Example, 90.0 grams of aqueous colloidal silica sol, while being rapidly stirred, was acidified by the addition of 0.75 milliliter concentrated nitric acid. The acidified colloidal silica was added to 320.0 grams of rapidly stirring zirconyl acetate solution. 52.05 grams of Niacet aluminum formoacetate (33.4% fired solids) were mixed in 300 milliliters deionized water and dissolved by heating to 80° C. The solution, when cooled, was mixed with the zirconyl acetate-silica mixture described previously. The resulting mixture was concentrated by rotoevaporation to 35% fired solids. The concentrated optical element precursor solution was added dropwise to stirred, hot (88°–90° C.) peanut oil. The precursor droplets were reduced in size by the agitation of the oil and gelled.

Agitation was continued in order to suspend most of the resulting gelled droplets in the oil. After about one hour, agitation was stopped and the gelled microspheres were separated by filtration. The recovered gelled microspheres were dried in an oven for about 5 hours at about 78° C. prior to firing. The dried microspheres were placed in a quartz dish and fired in air by raising the furnace temperature slowly to about 900° C. over 10 hours, maintaining about 9000 for 1 hour, and cooling the microspheres with the furnace. The initial firing of all the samples was done in a box furnace with the door slightly open. The optical element constituents were in the molar ration of $ZrO_2:Al_2O_3:SiO_2$ of 3:00:1.00:0.81

The coefficient of retroreflection ($R_A$), in $cd/Lux/m^2$, following Procedure B of ASTM Standard E 809-94a, was measured at an entrance angle of −4.0 degrees and an observation angle of 0.2 degrees. The photometer used for those measurements is described in U.S. Defensive Publication No. T987,003.

The coefficient of Retroreflective Luminance, $R_L$, was measured for each pavement marking example at a geometry which approximates an automobile at 30 meters distance from the sample. The pavement marking examples were placed onto a table in a dark room. Above the pavement marking examples was a plumbing system capable of delivering a uniform artificial rainfall at a rate of about 3.3 centimeters per hour. The pavement marking examples were illuminated with projector lamps. The nominal entrance angle to the samples was 88.8 degrees. A photometer (IL 1700 Research Radiometer/Photometer by International Light, Inc.; Newburyport, Mass.) was used to measure the Illuminance on the sample. Typical illumination of the prototypes was about 70 Lux. A telephotometer (Digital Luminance Meter Series L 1000 by LMT; Berlin, Germany) was placed about 30 meters from the samples at a height corresponding to an observation angle of 1.05 degrees. The Luminance of each of the samples was measured with the telephotometer, units of $cd/m^2$. $R_L$ is calculated by dividing the Luminance of the sample by the Illuminance.

The rainfall measurements were made two ways. The first was a fast draining experiment. The pavement marking examples were rained on. The rainfall was allowed to drain immediately off the aluminum panels onto which the pavement marking examples were attached. When a steady state rain Luminance was achieved, the rainfall was turned off. The Luminance was allowed to recover and the steady state recovered Luminance again was measured. Typically, the steady state recovered Luminance after the rain was turned on or off took about 3 minutes. In the second experiment, the pavement marking examples were contained within a trough. The trough was nominally 15 centimeters wide by about 1.5 meters long by about 1.5 millimeters deep. The pavement marking examples were thus elevated to a height of 1.5 millimeters and contained within a trough of about 1.5 millimeters deep. This trough resulted in a significantly slower drainage of water from the pavement marking examples representing a higher rainfall rate. The steady state recovered Luminance was measured during the rainfall and after recovery.

Examples 1–4 (Comparatives)

A polyurethane solution was coated onto a paper release liner using a notch bar. The polyurethane contained 27 weight percent titanium dioxide pigment. A polyurethane solution was mixed using the following components:

| | |
|---|---|
| 27.0% | Rutile titanium dioxide pigment (available as TIPURE ™ R-960, from DuPont, New Johnsonville, TN.) |
| 25.1% | TONE ™ 0301 polyester polyol (available from Union Carbide Corp., Danbury, CT.) |
| 47.9% | DESMODUR ™ N-100 aliphatic polyisocyante (available from Bayer Corp., Pittsburgh, PA.). |

Optical elements having different refractive indices (as set forth in following table) were then flood coated onto the surface of the polyurethane and oven cured at about 120° C. for about 15 minutes. The coefficient of retroreflection $R_A$ was measured. Retroreflective elements were then made as previously described. A pavement marking example was then made from the retroreflective elements as previously described. The coefficient of retroreflected luminance $R_L$ was then measured on the pavement marking example.

high refractive index (2.26) optical elements are used. These very high refractive index optical elements are typically glass which typically has poor abrasion resistance.

Examples 5–10

Glass optical elements having a 1.9 refractive index and an average diameter of 65 microns were embedded to approximately 40 percent of their average diameter in a polyethylene coated paper. The polyethylene coated paper was heated to about 135° C. and flood coated with glass optical elements preheated to about 135° C. The optical element coated web was maintained at about 135° C. for about an additional 3 minutes resulting in the glass optical elements becoming embedded to about 40 percent of their average diameter. A spacing layer solution was coated on top of the optical elements using a notch bar. The notch bar gap ranged from 0 to about 250 microns. The spacing layer solution consisted of:

| EXAMPLE | OPTICAL ELEMENT REFRACTIVE INDEX | OPTICAL ELEMENT TYPE | AVG. SIZE MICRONS | SPACING LAYER | REFLECTIVE LAYER |
|---|---|---|---|---|---|
| 1 | 1.75 | CERAMIC | 220 | NONE | $TiO_2$ |
| 2 | 1.91 | CERAMIC | 165 | NONE | $TiO_2$ |
| 3 | 2.26 | GLASS | 65 | NONE | $TiO_2$ |
| 4 | 1.5 | GLASS | 200 | NONE | $TiO_2$ |

| | COEFFICIENT OF RETRO-REFLECTION $(Cd/LX/M^2)$ | | CALCULATED COEFFICIENT OF RETROREFLECTED LUMINANCE - $R_L$ $(mCd/m^2/Lx)$ | | | | | |
|---|---|---|---|---|---|---|---|---|
| | DRY | WET | FAST WATER DRAINAGE | | | SLOW WATER DRAINAGE | | |
| EX. | -4/0.2 | -4/0.2 | DRY | RAIN | RECOVERY | DRY | RAIN | RECOVERY |
| 1 | 8.5 | 0.8 | 2400 | 480 | 250 | 950 | 140 | 100 |
| 2 | 15.4 | 0.9 | 1500 | 300 | 390 | 1400 | 190 | 190 |
| 3 | 1.4 | 4.2 | 520 | 550 | 800 | 570 | 590 | 590 |
| 4 | 1.3 | 0.4 | 300 | 68 | 91 | 220 | 50 | 67 |

These examples illustrate that titanium dioxide filled systems do not have adequate wet contrast levels unless very

| | |
|---|---|
| 23% | Ethylene Glycol Monobutyl Ether solvent (obtained from Dow Chemical USA; Midland, MI; under the trade name DOWANOL ™ EB) |
| 48% | #100 solvent (obtained from Shell Chemical Company; Baytown, TX; under the trade name CYCLO-SOL ™ 53) |
| 4% | AROPLAZ ™ 1351 (obtained from Reichold Chemicals Inc.; Newark, NJ) |
| 18% | BUTVAR ™ B76 (obtained from Solutia Inc.; Trenton, MI) |
| 7% | Beckamine P138 (obtained from Reichold Chemicals Inc.; Newark, NJ) |

-continued

| | |
|---|---|
| 0.5% | Tri-ethylamine (obtained from Air Products & Chemicals, Inc.; Shakopee, MN). |

The spacing layer solution was dried and cured in a succession of ovens at about 65° C., about 77° C., about 150° C., about 155° C., and about 170° C. for about one minute each. No spacing layer was applied to the optical elements in Example 5.

The exposed portion of the spacing layer was vaporcoated with aluminum as follows: The vacuum evaporator used was a NRC 3115 purchased from the Norton Company, Vacuum Equipment Division, Palo Alto, Calif. A sample measuring roughly 15 centimeters×15 centimeters was placed at the top of the chamber in the bell jar so that the back of the spacing layer was in direct sight of the aluminum source. Aluminum wire was placed between the filament electrodes. The vacuum chamber was closed and then pumped down to a pressure of about $10^{-6}$ torr ($1.3 \times 10^{-3}$ dyne/cm$^2$). The evaporation filament power supply was turned on and the power increased to a level necessary to vaporize the aluminum wire. A quartz-crystal oscillator was used to monitor the aluminum deposition. The shutter over the aluminum source was closed after about 900 Angstroms of aluminum was deposited. The example was then removed.

The coefficient of retroreflection $R_A$ was measured. Retroreflective elements were then made as previously described. A pavement marking example was then made from the retroreflective elements as previously described. The coefficient of retroreflected luminance $R_L$ was then measured on the pavement marking example.

| EXAMPLE | OPTICAL ELEMENT REFRACTIVE INDEX | OPTICAL ELEMENT TYPE | AVG. SIZE MICRONS | SPACING LAYER | REFLECTIVE LAYER |
|---|---|---|---|---|---|
| 5 | 1.93 | GLASS | 65 | NONE | Al VAPORCOAT |
| 6 | 1.93 | GLASS | 65 | 50 MICRON BAR GAP SOLVENT COATED | Al VAPORCOAT |
| 7 | 1.93 | GLASS | 65 | 100 MICRON BAR GAP SOLVENT COATED | Al VAPORCOAT |
| 8 | 1.93 | GLASS | 65 | 150 MICRON BAR GAP SOLVENT COATED | Al VAPORCOAT |
| 9 | 1.93 | GLASS | 65 | 200 MICRON BAR GAP SOLVENT COATED | Al VAPORCOAT |
| 10 | 1.93 | GLASS | 65 | 250 MICRON BAR GAP SOLVENT COATED | Al VAPORCOAT |

| | COEFFICIENT OF RETRO-REFLECTION (Cd/LX/M$^2$) | | CALCULATED COEFFICIENT OF RETROREFLECTED LUMINANCE - $R_L$ (mCd/m$^2$/Lx) | | | | | |
|---|---|---|---|---|---|---|---|---|
| | DRY | WET | FAST WATER DRAINAGE | | | SLOW WATER DRAINAGE | | |
| EXAMPLE | −4/0.2 | −4/0.2 | DRY | RAIN | RECOVERY | DRY | RAIN | RECOVERY |
| 5 | 536 | 0.8 | 8400 | 150 | 190 | 9000 | 120 | 120 |
| 6 | 49.0 | 30.9 | 4100 | 650 | 1200 | 3300 | 780 | 810 |
| 7 | 13.1 | 35.6 | 1700 | 1700 | 2700 | 1400 | 1700 | 1600 |
| 8 | 11.6 | 115 | 870 | 2200 | 4100 | 900 | 2200 | 2600 |
| 9 | 11.1 | 133 | 710 | 2000 | 4000 | 860 | 2100 | 2400 |
| 10 | 10.5 | 46.0 | 600 | 940 | 1500 | 670 | 1000 | 1000 |

These examples illustrate the highly desirably levels of $R_L$ that can be achieved in the rain (slow water drainage) using a spacing layer.

Examples 11–20

Ceramic optical elements having a 165 micron average diameter were embedded in an extruded spacing layer having a thickness ranging from 0 to about 150 microns. After cupping the spacing layer, the films were vaporcoated with about 900 angstroms of aluminum as described in Examples 5–10. The coefficient of retroreflection ($R_A$) was measured. Retroreflective elements were then made as previously described. A pavement marking example was then made from the retroreflective elements as previously described. The coefficient of retroreflected luminance $R_L$ was then measured on the pavement marking example.

| EXAMPLE | OPTICAL ELEMENT REFRACTIVE INDEX | OPTICAL ELEMENT TYPE | AVG. SIZE MICRONS | SPACING LAYER | PIGMENT |
|---|---|---|---|---|---|
| 11 | 1.91 | CERAMIC | 165 | NONE | A1 VAPORCOAT |
| 12 | 1.91 | CERAMIC | 165 | 50 MICRON EXTRUDED | A1 VAPORCOAT |
| 13 | 1.91 | CERAMIC | 165 | 63 MICRON EXTRUDED | A1 VAPORCOAT |
| 14 | 1.91 | CERAMIC | 165 | 75 MICRON EXTRUDED | A1 VAPORCOAT |
| 15 | 1.91 | CERAMIC | 165 | 88 MICRON EXTRUDED | A1 VAPORCOAT |
| 16 | 1.91 | CERAMIC | 165 | 100 MICRON EXTRUDED | A1 VAPORCOAT |
| 17 | 1.91 | CERAMIC | 165 | 113 MICRON EXTRUDED | A1 VAPORCOAT |
| 18 | 1.91 | CERAMIC | 165 | 125 MICRON EXTRUDED | A1 VAPORCOAT |
| 19 | 1.91 | CERAMIC | 165 | 138 MICRON EXTRUDED | A1 VAPORCOAT |
| 20 | 1.91 | CERAMIC | 165 | 150 MICRON EXTRUDED | A1 VAPORCOAT |

| | COEFFICIENT OF RETRO-REFLECTION (Cd/LX/M$^2$) | | CALCULATED COEFFICIENT OF RETROREFLECTED LUMINANCE - $R_L$ (mCd/m$^2$/Lx) | | | | | |
|---|---|---|---|---|---|---|---|---|
| | | | FAST WATER DRAINAGE | | | SLOW WATER DRAINAGE | | |
| EXAMPLE | DRY −4/0.2 | WET −4/0.2 | DRY | RAIN | RECOVERY | DRY | RAIN | RECOVERY |
| 11 | 100 | 0.6 | 4500 | 270 | 380 | 4500 | 160 | 260 |
| 12 | 19.0 | 1.0 | 2300 | 410 | 570 | 2300 | 300 | 370 |
| 13 | 18.0 | 3.0 | 1800 | 400 | 610 | 1600 | 330 | 460 |
| 14 | 15.0 | 7.0 | 980 | 540 | 860 | 910 | 520 | 690 |
| 15 | 9.0 | 22.0 | 570 | 1100 | 1700 | 570 | 1100 | 1400 |
| 16 | 8.0 | 57.0 | 520 | 1400 | 2200 | 500 | 1100 | 1200 |
| 17 | 8.0 | 78.0 | 470 | 950 | 1700 | 480 | 860 | 1600 |
| 18 | 7.0 | 38.0 | 430 | 380 | 820 | 420 | 270 | 370 |
| 19 | 7.0 | 41.0 | 470 | 470 | 980 | 470 | 440 | 660 |
| 20 | 5.0 | 9.0 | 520 | 300 | 590 | 510 | 180 | 240 |

These examples illustrate that extruded spacing layers on larger optical elements (165 microns) provide improved $R_L$ values in the rain (slow water drainage).

Examples 21–28

Ceramic optical elements (refractive index 1.91) having an average diameter of about 165 microns were partially embedded into a polyethylene coated polyester film by flood coating in an oven at 135° C. to about 30% of their average diameter. The optical elements were wetted with a 0.15% dilute aqueous solution of gamma-Aminopropyltriethoxysilane (obtained from Union Carbide Corporation; Danbury, Conn.), then dried in an oven at about 120° C. A pressure-sensitive adhesive was used to laminate the optical element film composite to an aluminum panel using a handroller. The aluminum panel was used to provide electrical grounding to the substrate during the powder coating operation. The aluminum panel measured about 15.2 centimeters by about 30.5 centimeters. The optical element film was then electrostatically powder coated with a powder of approximate 30 micron particle size made from Elvacite™ 2013 (an acrylic copolymer available from ICI Acrylics Inc., Cordova, Tenn.). A Nordson electrostatic powder spray gun operating at +80 kilovolts was mounted about 40 centimeters above electrically grounded rollers. The aluminum panel to which the optical element film was laminated was placed on the grounded rollers. The grounded rollers were driven at different speeds to effect the powder coating weight. Powder coating weights ranged from about 3.4 grams to about 6.6 grams for the 15 centimeters by 30 centimeters panel. Assuming a 165 micron optical element average diameter size, perfect packing of the optical elements in the optical element carrier, a theoretical optimum spacing layer thickness of 71% of the radius, and a specific gravity of the Elvacite™ 2013 powder of 1.15, then calculated theoretical mass of Elvacite™ 2013 powder is 5.5 grams per license plate.

Immediately after spraying, the powder coatings were fused onto the optical elements, conveyed through a series of ovens having heater temperatures at about 245° C., about 255° C., and about 320° C. for a total time of about 3 minutes. The web temperature ranged from about 120° C. and 150° C. The spacing layer was then vaporcoated with about 900 angstroms of aluminum as described in Examples 5–10. The vaporcoat side was then coated with an epoxy onto a rigid piece of aluminum. After the epoxy was cured, the polyethylene coated polyester optical element carrier was stripped off of the optical elements. The coefficient of retroreflection, $R_A$, was measured at −4.0/0.2 for both dry and under water conditions. The results are given in the following table:

| Example | Powder coating weight per 15 cm by 30 cm | Coefficient of Retroreflection, $R_A$, in cd/lx/m² −4.0/0.2 Dry | −4.0/0.2 Wet |
|---|---|---|---|
| 13 | 6.6 grams | 6.9 | 7.2 |
| 14 | 6.1 grams | 6.8 | 18 |
| 15 | 5.5 grams | 4.9 | 27 |
| 16 | 5.0 grams | 8.4 | 44 |
| 17 | 4.3 grams | 15 | 34 |
| 18 | 4.0 grams | 8.3 | 11 |
| 19 | 3.4 grams | 23 | 3.2 |
| 20 | 3.0 grams | 19 | 4.8 |

These examples illustrate that spacing layer can be applied to moderate sized optical elements (165 microns) by using powder coating.

Example 29

To form a core layer material, the ingredients in the following table were mixed in a Banbury internal mixer where they reached an internal temperature of approximately 150° C. The material was then cooled on a rubber mill and calendered into a sheet having a thickness of about 1.3 millimeters.

| COMPONENT | PARTS |
|---|---|
| Acrylonitrile-butadiene non-crosslinked elastomer precursor (Nipol 1022, Zeon Chemicals, Inc.; Louisville, KY) | 100 |
| Talc platelet filler particles averaging 2 microns in size (MISTRON SUPERFROST ™, Luzenac America, Inc.; Englewood, CO) | 100 |
| 3 denier polyester filament 6 mm long (SHORT STUFF ™ 6-3025, Mini Fibers, Inc.; Johnson City, TN) | 10 |
| Fibers of high-density polyethylene having a molecular weight ranging between 30,000 and 150,000 (SHORT STUFF ™ 13038F, Mini Fibers, Inc.) | 20 |
| Phenol type anti-oxidant (SANTO WHITE ™ crystals, Monsanto Co.; Nitro, WV) | 2 |
| Chlorinated paraffin (CHLOREZ ™ 700S, Dover Chemical Corp.; Dover, OH) | 70 |
| Chlorinated paraffin (PAROIL ™ 140LV, Dover Chemical Corp.; Lake Charles, LA) | 5 |
| Spherical silica reinforcing filler (HISIL ™ 233, PPG Industries, Inc.; Lake Charles, LA) | 20 |
| Stearic acid processing aide Hamko Chemical; Memphis, TN | 1.0 |
| Chelator (VANSTAY ™ SC, R. T. Vanderbilt Company, Inc.; Norwalk, CT) | 0.5 |
| Ultramarine blue 5016 (Whittacker, Clark & Daniels, Inc.; South Plainfield, NJ) | 0.5 |
| Rutile titanium dioxide pigment (TIPURE ™ R-960, Dupont; New Johnsonville, TN) | 130 |
| Transparent glass microspheres averaging about 100 microns in diameter and having a refractive index of 1.5 (Flex-O-Lite, Inc.; Muscatine, IA) | 280 |

-continued

| COMPONENT | PARTS |
|---|---|
| TOTAL | 739 |

A pressure sensitive adhesive was used to laminate five sheets of the above material together resulting in a core layer sheet having an approximate thickness of about 6.4 millimeters.

A polyethylene coated polyester carrier was heated in an oven to a temperature of about 120° C. This carrier was then covered with a layer of ceramic optical elements having a refractive index of about 1.91 and an average diameter of about 165 microns. The optical elements became embedded to approximately 40% of their average diameter.

The spacing layer solution from Examples 5–10 was coated on top of the optical elements using a notch bar. The notch bar gap was about 250 microns. The spacing layer was dried and cured in an oven for about 20 minutes at about 80° C., then for about 10 minutes at about 150° C.

The spacing layer was then vaporcoated with approximately 900 angstroms of aluminum as described in Examples 5–10. The optical elements, spacing layer and reflective layer were then separated from the polyethylene coated polyester, forming the retroreflective article.

A pressure sensitive adhesive was laminated to the aluminum vaporcoat of the retroreflective article. The adhesive side of the retroreflected article was then laminated to both sides of the calendered core creating a retroreflective composite. The retroreflective composite was then cut with a knife lengthwise into strips measuring about 3 millimeters thick. The strips were then cut crosswise about every 20 millimeters forming a retroreflective element in the form of a rectangular cube with the approximate dimensions of 3 millimeters high by 20 millimeters long by 6.4 millimeters wide. The retroreflective article was attached to the 3 millimeter high by 20 millimeter long side. When illuminated with a flashlight dry and under water the sides of the retroreflective elements with the retroreflective article were highly retroreflective.

Example 30

A retroreflective element can be made as follows:

The core layer can be made by mixing the ingredients in the table of Example 29 in a Banbury mixer to an internal temperature of about 150° C. The material can then be cooled on a rubber mill and then calendered into a sheet having a thickness of about 6.0 millimeters.

A cupping resin can be bar coated and forced air dried onto a 0.1 millimeter thick PET liner (e.g., a 40% solids solution of VITEL™ 3300 resin available from Bostik, Middleton, Mass.). The cupping resin will measure about 0.1 millimeters thick when dry. A spacing layer can then be extruded onto the cupping film forming a composite spacing layer. The spacing layer can comprise, for example PRIMACOR 3440, (an extrusion grade thermoplastic, high molecular weight copolymer believed to comprise a major portion of ethylene monomer and a minor portion of acrylic acid monomer, available from DOW Chemical Co. Midland, Mich., having a melt flow index of about 10), a weather stabilizing system, and an antioxidant.

A second film (i.e. the optical element carrier) can be made by extruding polyethylene onto a 0.1 millimeter thick PET liner. The thickness of the polyethylene will be approximately 60 microns. The second film can be heated to a temperature of about 135° C. Ceramic optical elements (with an average diameter of about 165 microns and a refractive index of about 1.91) can then be dropped from a dispenser and become partially embedded to about 40% of their average diameter into the softened second film to form a monolayer of optical elements. The optical elements can be reverse roll coated with a 0.15% aqueous solution of A1100 (available from Union Carbide, Danbury, Conn.) and dried in an oven.

The optical element film composite can be laminated to the composite spacing layer to partially embed the optical elements into the spacing layer. This can be accomplished by running the composite spacing layer over a hot can at a temperature of about 135° C., then laminating to the optical element film.

Next, the cupping film can be stripped away from the composite spacing layer which will now be adhered to the optical elements. The exposed spacing layer can be e-beamed to crosslink the spacing layer. The exposed spacing layer can then be vaporcoated with about 900 angstroms of aluminum as described in Examples 5–10. The optical element carrier can be stripped away from the laminate, exposing the optical elements.

A top layer containing a pigmented thermoplastic resin (e.g., EMAA film) can be laminated to the reflective layer to produce two films. These two films can then be laminated to both sides of the calendered core layer forming a retroreflective composite. The retroreflective composite can be cut with a knife lengthwise into strips measuring about 3 millimeters thick. The strips can be cut crosswise about every 20 millimeters forming a retroreflective element in the form of a rectangular cube with the approximate dimensions of 3 millimeters high by 20 millimeters long by 6.4 millimeters wide. The retroreflective article can be attached to the 3 millimeter high by 20 millimeter long side.

Example 31

A base layer can be made by mixing the ingredients in the table of Example 29 in a Banbury mixer to an internal temperature of about 150° C. The material can be cooled on a rubber mill and then calendered into a sheet having a thickness of about 1.0 millimeters. A polyurethane solution can be mixed using the following components:

| | |
|---|---|
| 27.0% | Rutile titanium dioxide pigment (available as TIPURE ™ R-960, from DuPont, New Johnsonville, TN.) |
| 25.1% | TONE ™ 0301 polyester polyol (available from Union Carbide Corp., Danbury, CT.) |
| 47.9% | DESMODUR ™ N-100 aliphatic polyisocyanate (available from Bayer Corp., Pittsburgh, PA.) |

The polyurethane can be coated onto the base sheet to a thickness of about 0.4 millimeters using a notch bar. While still liquid, the retroreflective elements of Example 22 can be dropped into the polyurethane. The retroreflective elements can be arranged such that their retroreflective portions will be pointing generally along the longitudinal dimension of the coated base sheet. The retroreflective elements can be placed in the polyurethane in columns across the width of the base sheet. The retroreflective elements will be spaced about 50 millimeters apart within a column. Each adjacent column will be displaced longitudinally about 25 millimeters from its nearest neighbor. The polyurethane can then be cured in an oven to form a pavement marking. A pressure sensitive adhesive can be laminated to the bottom of the base sheet. The base sheet can be cut longitudinally to form stripes measuring 10 centimeters wide to form a pavement marking tape. The pavement marking tape can be adhered to a roadway.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of making retroreflective elements comprising:

(a) providing at least one retroreflective article wherein said retroreflective article comprises:

(i) a monolayer of optical elements for providing wet retroreflectivity, the elements having an exposed-lens surface portion and an embedded-lens surface portion;

(ii) a curved spacing layer in contact with the embedded lens surface, the average thickness of the spacing layer relative to the average radius of said optical elements being selected such that the retroreflective article has greater wet retroreflectivity that an article made without the spacing layer; and (iii) a reflective layer next to the spacing layer;

(b) forming a core layer;

(c) attaching said retroreflective article onto said core layer yielding a retroreflective composite; and (d) dividing said composite into retroreflective elements.

2. The method of making retroreflective elements according to claim 1, wherein said optical elements comprise material selected from the group consisting of glass, ceramic, or mixtures thereof.

3. The method of making retroreflective elements according to claim 1, wherein said optical elements have a refractive index ranging from about 1.7 to about 2.4.

4. The method of making retroreflective elements according to claim 1, wherein said optical elements have an average diameter ranging from about 50 micrometers to about 1000 micrometers.

5. The method of making retroreflective elements according to claim 1, wherein said optical elements have an exposed surface and an embedded surface and said spacing layer is layered on the embedded surface of said optical elements.

6. The method of making retroreflective elements according to claim 5, wherein said spacing layer forms a cup around said optical elements on the embedded surface of said optical elements.

7. The method of making retroreflective elements according to claim 1, wherein said spacing layer has a thickness ranging from about 0.05 to about 1.4 times the radius of the optical elements.

8. The method of making retroreflective elements according to claim 1, wherein said spacing layer is formed on said optical element layer using a method selected from the group consisting of extrusion, lamination, powder coating, curtain coating, and solution coating.

9. The method of making retroreflective elements according to claim 1, wherein said reflective layer is formed on said spacing layer using a method selected from the group consisting of knife coating, roll coating, extrusion, powder coating, precipitation, thermal evaporation in a vacuum, sputter coating, electrodeposition, and chemical vapor deposition.

10. The method of making retroreflective elements according to claim 1, wherein said core layer is formed using extrusion.

11. The method of making retroreflective elements according to claim 1, wherein said core layer is formed using calendering.

12. The method of making retroreflective elements according to claim 1, wherein said retroreflective article is attached to said core layer using a binder material.

13. The method of making retroreflective elements according to claim 12, wherein said core layer is laminated to said retroreflective article using said binder material.

14. The method of making retroreflective elements according to claim 1 wherein two retroreflective articles are laminated to the core layer.

15. The method of making retroreflective elements according to claim 1, wherein said retroreflective article is wrapped around said core layer.

16. The method of making retroreflective elements according to claim 1, wherein said retroreflective element in step (d) is formed from a method selected from the group consisting of dividing with a knife, a water jet, or die cutting.

17. A method of making retroreflective elements, wherein said retroreflective elements made according to claim 1, is then adhered to a roadway via a roadway binder.

18. A method of making retroreflective elements, wherein said retroreflective elements made according to claim 1, is then attached to a preformed pavement marking tape.

19. A method according to claim 1, wherein the average thickness of the spacing layer relative to the average radius of said optical elements is from 0.8 to 1.2 times a fraction calculated from the formula exp(−3.99* (optical element refractive index)+7.2).

20. A method according to claim 19, wherein said optical elements for providing wet reflectivity have a refractive index ranging from about 1.7 to about 2.4.

21. A method according to claim 1, wherein the retroreflective article also comprises a monolayer of exposed-lens optical elements for providing dry retroreflectivity.

22. A method according to claim 21, wherein the average thickness of the spacing layer relative to the average radius of said optical elements for providing dry retroreflectivity is from 0.85 to 1.15 times a fraction calculated from the formula exp(−6.89* (optical element refractive index)+10.2).

* * * * *

UNITED STATES PATENT AND TRADEMARK OFFICE
CERTIFICATE OF CORRECTION

PATENT NO.     : 6,247,818 B1
DATED          : June 19, 2001
INVENTOR(S)    : Hedblom Thomas P.

It is certified that error appears in the above-identified patent and that said Letters Patent is hereby corrected as shown below:

Column 6,
Line 5, delete "A" before the word "solvent".

Column 8,
Line 9, delete "usefuil" and insert -- in place thereof -- usefull --.
Line 50, delete "VITELTM" and insert in place thereof -- VITEL$^{TM}$ --.

Column 9,
Line 31, after the word "radius" insert -- . --.

Column 13,
Line 25, delete "0.83 M N0$_3$" and insert in place thereof -- 0.83 M NO$_3$ --.
Line 25, delete "Zro$_2$" and insert in place thereof -- ZrO$_2$ --.
Line 67, delete "9000" and insert in place thereof -- 900$^{\circ}$ --.

Signed and Sealed this

Twenty-fifth Day of March, 2003

JAMES E. ROGAN
*Director of the United States Patent and Trademark Office*